United States Patent
Zhang (10) Patent No.: US 11,297,154 B2
(45) Date of Patent: Apr. 5, 2022

(54) DATA TRANSMISSION METHOD AND DEVICE, TERMINAL AND SERVER

(71) Applicant: ZTE Corporation, Shenzhen (CN)

(72) Inventor: Lu Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 113 days.

(21) Appl. No.: 16/641,237

(22) PCT Filed: Apr. 11, 2018

(86) PCT No.: PCT/CN2018/082639
§ 371 (c)(1),
(2) Date: Feb. 22, 2020

(87) PCT Pub. No.: WO2019/037439
PCT Pub. Date: Feb. 28, 2019

(65) Prior Publication Data
US 2020/0228619 A1 Jul. 16, 2020

(30) Foreign Application Priority Data
Aug. 25, 2017 (CN) .......................... 201710743834.5

(51) Int. Cl.
*H04W 80/06* (2009.01)
*H04L 67/568* (2022.01)
(Continued)

(52) U.S. Cl.
CPC .......... *H04L 67/2842* (2013.01); *H04L 12/56* (2013.01); *H04L 61/2007* (2013.01);
(Continued)

(58) Field of Classification Search
CPC . H04L 67/2842; H04L 12/56; H04L 61/2007; H04L 69/16; H04L 69/326; H04L 2212/00; H04W 80/06
See application file for complete search history.

(56) References Cited

U.S. PATENT DOCUMENTS

2002/0136218 A1 9/2002 Cardoso, Jr.
2004/0057434 A1 3/2004 Poon et al.
(Continued)

FOREIGN PATENT DOCUMENTS

CN 101150497 A 3/2008
CN 107040474 A 8/2017
(Continued)

OTHER PUBLICATIONS

International Searching Authority, International Search Report and Written Opinion for PCT Application No. PCT/CN2018/082639 and English translation, dated Jun. 27, 2018, pp. 1-11.
(Continued)

*Primary Examiner* — Fahmida S Chowdhury
(74) *Attorney, Agent, or Firm* — Vivacqua Crane PLLC (57) ABSTRACT

Provided are a data transmission method and device, terminal, and server, the method comprising: caching a data IP package generated by an upper layer application before reaching a package assembling point; encapsulating cached data IP packages as a data payload in a new IP package after reaching the package assembling point; configuring a destination address in the new IP package to be a proxy server address; and sending the new IP package to the proxy server.

16 Claims, 6 Drawing Sheets

(51) Int. Cl.
*H04L 12/54* (2022.01)
*H04L 61/5007* (2022.01)
*H04L 69/16* (2022.01)
*H04L 69/326* (2022.01)

(52) U.S. Cl.
CPC ............ *H04L 69/16* (2013.01); *H04L 69/326* (2013.01); *H04W 80/06* (2013.01); *H04L 2212/00* (2013.01)

(56) References Cited

U.S. PATENT DOCUMENTS

| | | | | |
|---|---|---|---|---|
| 2008/0025230 A1* | 1/2008 | Patel | ............... | H04L 41/5022 370/252 |
| 2008/0112543 A1* | 5/2008 | Liu | ............... | H04L 41/0686 379/29.01 |
| 2010/0070623 A1* | 3/2010 | Sawada | ............... | H04L 61/2084 709/224 |
| 2011/0113251 A1 | 5/2011 | Lu et al. | | |
| 2014/0177448 A1* | 6/2014 | Wu | ............... | H04W 28/18 370/237 |
| 2017/0250954 A1* | 8/2017 | Jain | ............... | H04L 63/1416 |
| 2020/0241136 A1 | 7/2020 | Pang et al. | | |

FOREIGN PATENT DOCUMENTS

| | | |
|---|---|---|
| EP | 1848172 A1 | 10/2007 |
| EP | 2424187 A2 | 2/2012 |

OTHER PUBLICATIONS

China National Intellectual Property Administration. First Office Action for CN Application No. 201710743834.5 and English translation, dated Dec. 8, 2020, pp. 1-7.
China National Intellectual Property Administration. First Search for CN Application No. 2017107438345 and English translation, pp. 1-2.
China National Intellectual Property Administration. Second Office Action for CN Application No. 201710743834.5 and English translation, dated May 21, 2021, pp. 1-10.
European Patent Office. European Search Report for EP Application No. 18849175.7, pp. 1-4.
European Patent Office. Supplementary European Search Report for EP Application No. 18849175.7. pp. 1-4.

* cited by examiner

DATA TRANSMISSION METHOD AND DEVICE, TERMINAL AND SERVER

TECHNICAL FIELD

The present disclosure relates to the field of data communication, and in particular, to a data transmission method and device, a terminal, and a server.

BACKGROUND

Internet of Things (IoT) is a major trend in the development of current communication technologies. In recent years, both large-scale specification organizations such as 3GPP, and network operators, terminal manufacturers in various countries, have begun to "dig toward the low end" to seek a technical direction of low rate, low bandwidth, and low power consumption. eMTC and NB-IoT protocols are hot spots pursued by manufacturers.

The Internet of Things has very demanding requirements on terminal power consumption, especially a target of terminal power consumption for NB-IoT is based on a 5000 mAh battery with a service life of 10 years. Therefore, it is an important research direction to improve data transmission efficiency, reduce power consumption, and extend a battery life of terminal equipment.

One of design pursuits on the terminal is to send the least data in the premise of achieving the same function, which is dependent on characteristics of the power consumption working environment of IoT terminals. The IoT terminals, especially those based on NB-IoT protocol, usually work in non-mobile scenarios and are installed in hidden locations. The signal strength and quality of this working environment are generally poor, and the cost for the terminal to send data is higher than that of ordinary data products.

In addition, data packages in the IoT application scenario have the characteristics of discontinuity and small bytes, and NB-IoT has very loose requirements for data transmission delay. It is suitable for scenario where a rate is below 250 kbps and a delay tolerance reaches 10 seconds, which is a typical narrowband application scenario.

Figure 1A:
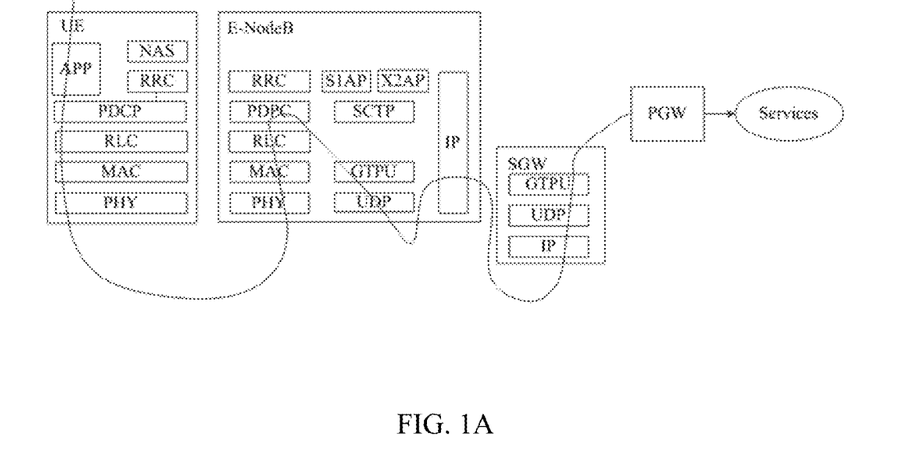
FIG. 1A is a data transmission process conforming to 3GPP standard in the related art.
Figure 1B:
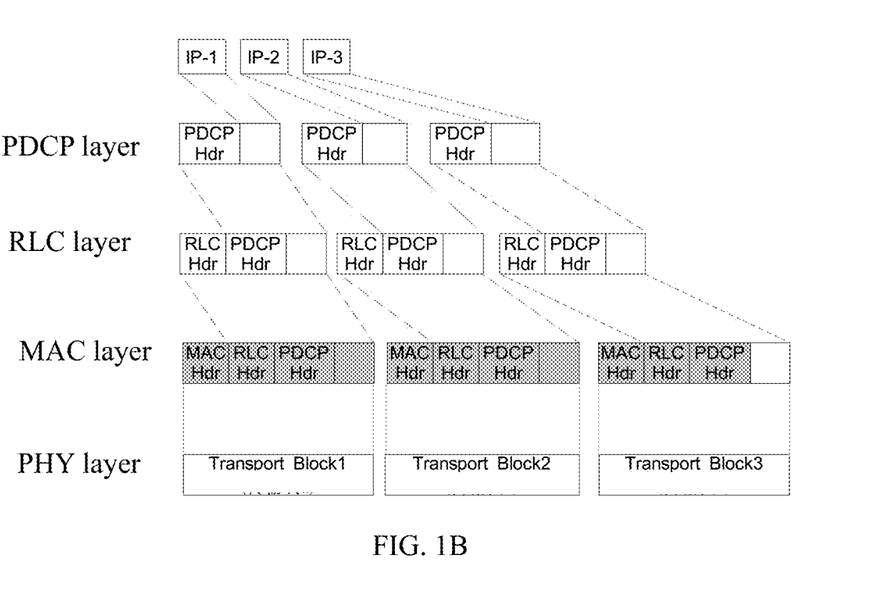
FIG. 1B is a schematic diagram of a solution on the terminal side in the related art.

As shown in FIG. 1A, it is a data transmission process conforming to 3GPP standard in the related art. As shown in FIG. 1A, an application on the UE generates IP data packages, which are finally sent to E-NodeB base station in the form of physical layer transmission blocks through PDCP, RLC, MAC, and PHY, and then sent to core networks and services (i.e. application server) by the E-NodeB base station. The solution on the terminal side is shown in FIG. 1B. Three data packages to be sent, IP-1, IP-2 and IP-3, first enter the PDCP layer; after processing such as header compression is performed in the PDCP layer, the PDCP header is added, and then the RLC layer is entered; after processing such as dividing is performed in the RLC layer, the RLC header is added, and then the MAC layer is entered; after processing is performed in the MAC layer and the MAC frame header is added, finally the PHY physical layer is entered to form a physical layer transmission block, and the physical layer transmission block is sent out through an air interface. The three data packages are sent out through this process in turn.

The existing data transmission solutions in the 3GPP standard, if applied in NB-IoT Internet of Things scenario, will cause excessive redundant data of the package header added in each layer of wireless layer when the terminal sends data. The redundant data accounts for a large proportion in the physical layer transmission block, and a transmission of this part of redundant data will cause some unnecessary power consumption. Thus, it is not suitable for NB-IoT scenarios which have extremely demanding requirements on terminal power consumption.

SUMMARY

In order to solve the above problems, the present disclosure provides a data transmission method and device, a terminal, and a server, which can solve the problem of large power consumption caused by excessive redundant data.

In order to solve the above technical problems, the present disclosure provides a data transmission method, which includes:
  caching a data IP package generated by an upper layer application before reaching a package assembling point;
  encapsulating cached data IP packages as a data payload in a new IP package after reaching the package assembling point; configuring a destination address in the new IP package to be a proxy server address; and
  sending the new IP package to a proxy server In the embodiments of the present disclosure, a length of the new IP package is less than or equal to 1480 bytes.

In the embodiments of the present disclosure, the package assembling point is set as 0.5 to 10 seconds.

A data transmission method, herein the method includes:
  receiving an IP package sent by a terminal;
  parsing the received IP package; parsing a data payload of the received IP package into multiple IP packages when the data payload includes multiple IP packages; and forwarding each parsed IP package to an application server corresponding to each IP package.

In the embodiments of the present disclosure, the method further includes: adding a mapping entry into a forwarding mapping table after forwarding the IP package;
  the mapping entry includes a source IP address, a destination IP address, a source port number, a destination port number, and a transport layer protocol type.

In the embodiments of the present disclosure, when data issued by an application server is received, a corresponding destination IP address is searched according to the mapping table, and the received data is forwarded to a terminal corresponding to the destination IP address.

A data transmission device, provided on a terminal, wherein the device includes:
  a cache unit, configured to cache a data IP package generated by an upper layer application before reaching a package assembling point;
  an encapsulation unit, configured to encapsulate cached data IP packages as a data payload in a new IP package after reaching the package assembling point; configuring a destination address in the new IP package to be a proxy server address; and
  a sending unit, configured to send the new IP package to a proxy server.

In the embodiments of the present disclosure, a length of the new IP package is less than or equal to 1480 bytes.

In the embodiments of the present disclosure, the package assembling point is set as 0.5 to 10 seconds.

In order to solve the above technical problems, the present disclosure further proposes a terminal, which includes any of the above data transmission devices provided on the terminal.

In order to solve the above technical problems, the present disclosure further proposes a data transmission device, wherein the device includes:

a receiving unit, configured to receive an IP package sent by a terminal a parsing unit, configured to parse the received IP package, and parse a data payload of the received IP package into multiple IP packages when the data payload comprises multiple IP packages; and a forwarding unit, configured to forward each parsed IP package to an application server corresponding to each IP package.

In the embodiments of the present disclosure, the device further includes:

a mapping unit, configured to add a mapping entry into a forwarding mapping table after the forwarding unit forwards the IP package; the mapping entry includes a source IP address, a destination IP address, a source port number, a destination port number, and a transport layer protocol type.

In the embodiments of the present disclosure, the forwarding unit is further configured to, search a corresponding destination IP address according to the mapping table when data issued by the application server is received, and forward the received data to a terminal corresponding to the destination IP address.

In order to solve the above technical problems, the present disclosure further proposes a server, which includes any of the above data transmission devices provided on the server.

The technical solution provided by the present disclosure includes: caching a data IP package generated by an upper layer application before reaching a package assembling point; encapsulating cached data IP packages as a data payload in a new IP package after reaching the package assembling point; configuring a destination address in the new IP package to be a proxy server address; and sending the new IP package to a proxy server. By means of the solution of the present disclosure, the transmission of redundant data may be significantly reduced, the transmission efficiency may be improved, and transmission power may be reduced, thereby reducing the terminal power consumption; the solution is very suitable for an NB-IoT terminal which has demanding power consumption requirements and is not sensitive to delay.

BRIEF DESCRIPTION OF THE DRAWINGS

The drawings in the embodiments of the present disclosure are described below. The drawings in the embodiments are for further understanding of the present disclosure, and are used to explain the present disclosure together with the description, which does not constitute a limitation on the protection scope of the present disclosure.

DETAILED DESCRIPTION

In order to facilitate those skilled in the art to understand, the present disclosure will be further described below in combination with the accompanying drawings, which cannot be used to limit the protection scope of the present disclosure. It should be noted that, the embodiments in the present application and various modes in the embodiments can be combined with each other without confliction.

Figure 2:
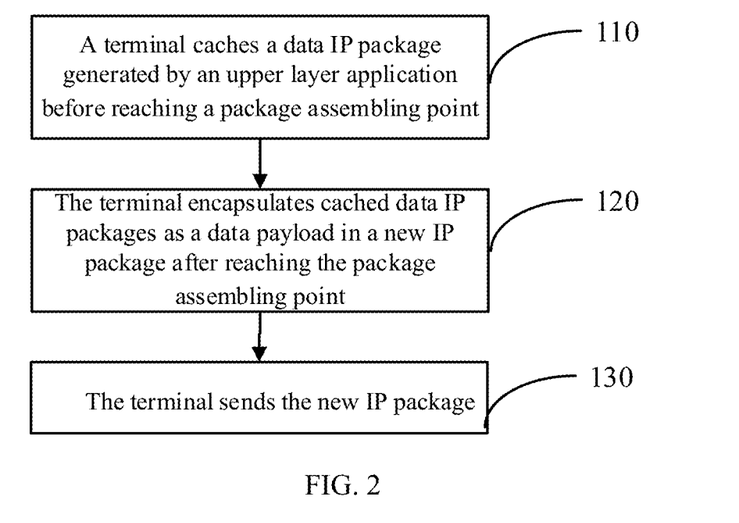
FIG. 2 is a flowchart of a data transmission method according to an embodiment of the present disclosure.

Referring to FIG. 2, the present disclosure proposes a data transmission method. The method includes:

step 110: the terminal caches a data IP package generated by an upper layer application before reaching a package assembling point;

step 120: the terminal encapsulates cached data IP packages as a data payload in a new IP package after reaching the package assembling point; and configuring a destination address in the new IP package to be a proxy server address;

herein, the terminal takes the cached data IP packages as a data payload in the new IP package;

step 130: the terminal send the new IP package.

herein, the package assembling point is set to 10S; a length of the new IP package is set to be less than or equal to 1480 bytes. If the data payload is greater than 1480 bytes, the cached data IP can be encapsulated into multiple IP packages, and the length of each IP package is less than or equal to 1480 bytes.

By means of the solution of the present disclosure, the transmission of redundant data may be significantly reduced, the transmission efficiency may be improved, and the transmission power may be reduced, thereby reducing the terminal power consumption; the solution is very suitable for an NB-IoT terminal which has demanding power consumption requirements and is not sensitive to delay. The solution has the following advantages:

(1) It has benefits of reducing the amount of data transmission, namely, power reduction and power saving.

(2) After assembling new packages, no redundant information is generated. Since each IP package header of the payload data has a field indicating a total length of the IP package, an unpacking module of the proxy server may perform unpacking by reading this field. Thus, this solution does not need to add any additional redundant information.

(3) It has good protocol compatibility. This solution is a supplement and optimization for NB-IoT, and is proposed mainly based on the fact that the NB-IoT terminal is not sensitive to time delay. The solution is especially suitable for NB-IoT application scenarios that are not sensitive to delay and are sensitive to power consumption and standby time. There is no need to modify the NB-IoT protocol, and add network elements on the wireless network side. The added proxy server also belongs to the application layer, that is, the role in the application scenario. Therefore, the release and application of the solution does not need to be promoted by protocol organizations such as 3GPP, and does not need the additional investment of operators. A terminal OEM manufacturer itself can deploy it. Thus, the application of this optimization solution is highly feasible and easy to implement.

Figure 3:
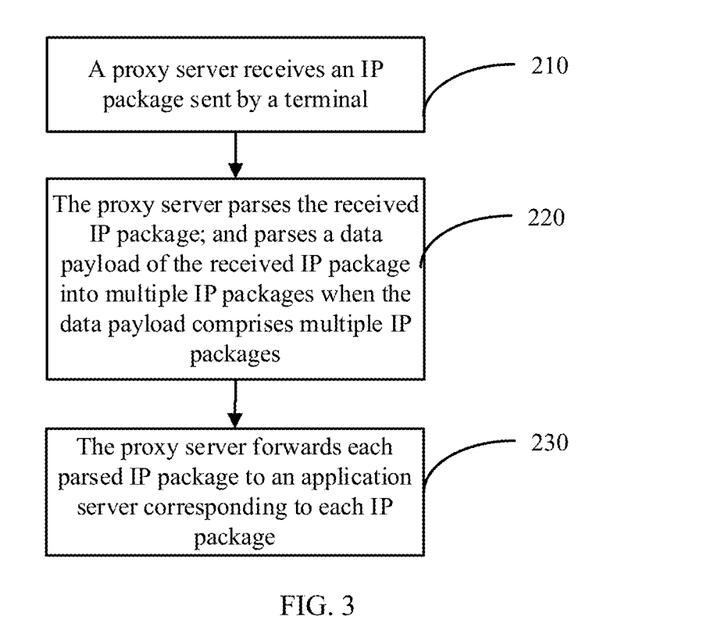
FIG. 3 is a flowchart of another data transmission method according to an embodiment of the present disclosure.

Referring to FIG. 3, the present application provides a data transmission method, which includes:

step 210: the proxy server receives an IP package sent by the terminal.

step 220: the proxy server parses the received IP package, and divides a data payload of the received IP package into multiple IP packages if the data payload includes a plurality of IP packages;

step 230: the proxy server forwards each divided IP package to an application server corresponding to each IP package.

After step 220, the method further includes: adding a mapping record to a mapping table;

the mapping record includes a source IP address, a destination IP address, a port number, and a transport layer protocol type.

In the embodiments of the present application, the proxy server when it receives data issued by the application server, searches the corresponding terminal according to the mapping table, and forwards the received data to the corresponding terminal.

The following will be explained in combination with specific implementation scenarios.

Figure 4A:
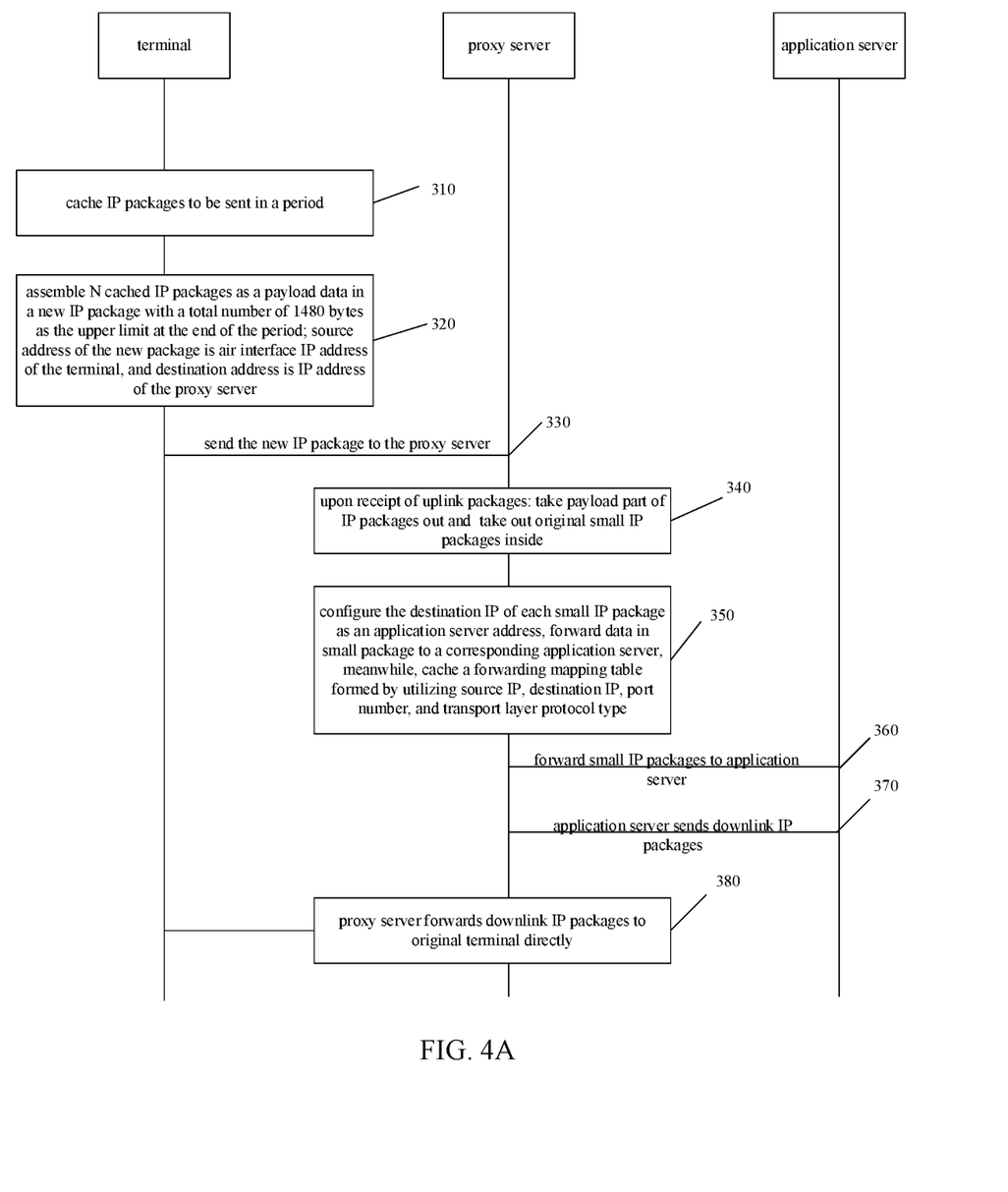
FIG. 4A is a flowchart of yet another data transmission method according to an embodiment of the present disclosure.

Referring to FIG. 4A, the present application provides a data transmission method, in which a diagram for an interaction between multiple entities in the system is shown. Herein, the terminal may refer to NB-IoT terminal, such as meter reader, locator, etc.; the proxy server and application server are common servers matched with the terminal and maintained by application manufacturers, and may be flexibly deployed at any location on the Internet independent of wireless operator network. FIG. 4A illustrates a process in which a terminal sends a data package, a proxy server forwards it, and an application server sends downlink response data back to the terminal.

As shown in FIG. 4A, the data transmission method proposed in the present disclosure includes:

step 310: the terminal caches an IP package generated by the application layer in a period of one second before entering the PDCP layer of the NB-IoT protocol stack.

The purpose of caching the IP packet generated by the application layer is to perform assembling action at the period time (i.e. a package assembling point);

step 320: the terminal assembles the cached IP package data according to a preset upper limit of length when it determines that the package assembling point is reached.

Figure 4B:
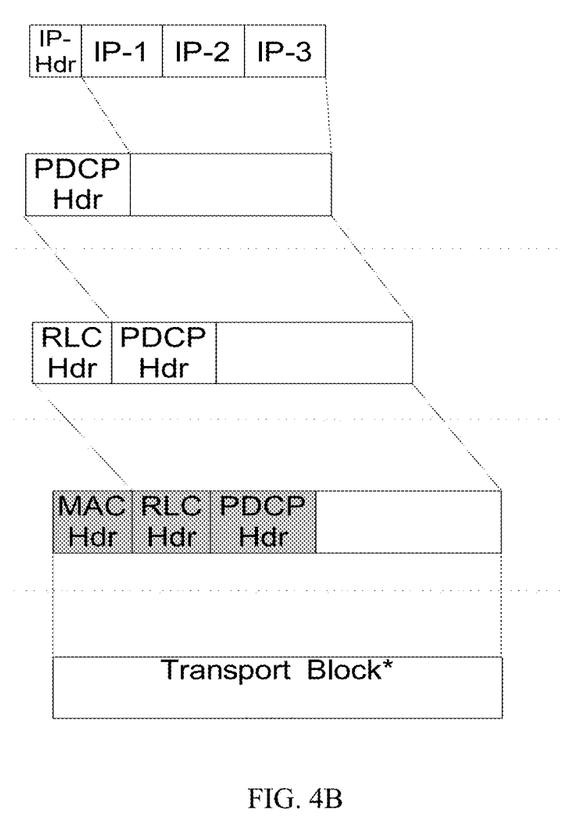
FIG. 4B is a schematic diagram of a process for assembling original data packages by a terminal according to an embodiment of the present disclosure.

As shown in FIG. 4B, it is a schematic diagram of a process for the terminal to assemble the original data package. As shown in the figure, the package assembling includes two processes: cache and encapsulation. In the figure, three IP packages to be sent by the application are taken as an example for illustration. The moments when the three IP packages are generated are 0.2 second, 0.4 second, and 0.6 second respectively (relative times is adopted), and the package assembling period is 1 second, that is, package assembling and data transmission are performed once per second. These three IP packages will be cached, and encapsulated as payload data in a new IP-* package when reaching the package assembling point, i.e. 1 second. The destination address of the new IP package IP-* is filled with 5.5.5.6, which is the IP address of the proxy server. The filling of the three IP packages in the payload data body is a tight connection filling, without any additional data and supplementary bits. After package assembling, the IP-* data package will be sent to the proxy server through the NB-IoT protocol stack.

Preferably, the length of the upper limit is set to 1480 bytes. Considering that the MTU (the total length of the IP package sent under the largest non-fragmentation case) is generally 1500 bytes, and the IP package header is 20 bytes, the cached IP package data is assembled with 1480 bytes as the upper limit. If the total length of all IP packages is less than 1480 bytes, the actual length of all IP packages is taken as the payload length of the new IP package, and the IP address of the proxy server is taken as the destination address, so as to assemble a new IP package. If the total data of the cached IP package is greater than 1480 bytes, the cached package is divided into several sets, and the total length of each set is no more than 1480 bytes. Each set forms a separate large IP package, and the destination address in the header is filled as the IP address of the proxy server.

Step 330: the terminal send the IP package after assembling to the proxy server.

Step 340: after receiving the large uplink package, the proxy server performs an parsing operation of the IP package, that is, the payload part of the large package is parsed out, and multiple original IP small packages inside the payload part are parsed out; each IP package before assembling is obtained.

Figure 4C:
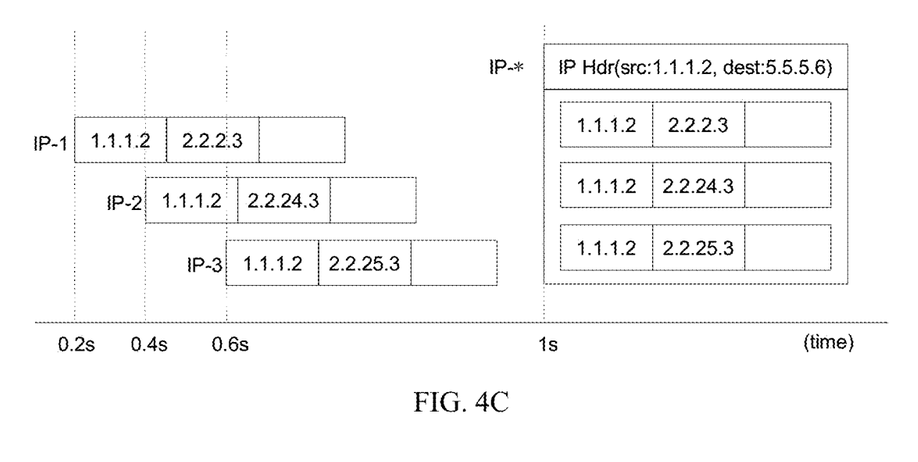
FIG. 4C is a schematic diagram of a process for parsing a large package of IP package by a proxy server according to an embodiment of the present disclosure.

As shown in FIG. 4C, it is a process of parsing a large IP package by a proxy server. As shown in the figure, after receiving an IP-* data package sent from the terminal, the proxy server first parses the data package, that is, the payload data part is parsed into the original IP-1, IP-2, and IP-3 data packages, and then forwards them to the corresponding application servers of the three data packets according to their respective destination addresses. When a data package is forwarded, the source and destination IP, port, and transport layer protocol type are recorded to form a forwarding mapping table, which aims to provide a comparison for the downlink data flow when it is forwarded. The downlink data of the server is sent to the proxy server first, and a forwarding module of the proxy server queries the mapping table, then forwards the data package directly to the corresponding terminal. The situation of the downlink data flow is marked with a dashed line in the figure.

In the embodiments of the present disclosure, the IP package after package assembling is referred to as a large package, and the IP package before package assembling or the IP package after parsing is referred to as a small package.

Step 350: cache a forwarding mapping table according to the source and destination IP addresses, port number, and transport layer protocol type.

As shown in Table 1, it is a structure diagram of the forwarding mapping table structure:

TABLE 1

Structure diagram of the forwarding mapping table structure

| Source IP address 1 | Destination IP address 1 | Source port number 1 | Destination port number 1 | Transport layer protocol 1 |
| --- | --- | --- | --- | --- |

TABLE 1-continued

Structure diagram of the forwarding mapping table structure

| Source IP address 2 | Destination IP address 2 | Source port number 2 | Destination port number 2 | Transport layer protocol 2 |
|---|---|---|---|---|
| ... | ... | ... | ... | ... |
| Source IP address N | Destination IP address N | Source port number N | Destination port number N | Transport layer protocol N |

Step 360: forward the IP small package to the application server.

Step 370: receive the downlink data sent by the application server.

Step 380: after receiving the downlink data sent by the application server, look up the forwarding table to forward the downlink data to the terminal.

Herein, the server does not perform package assembling for the downlink data, so as to avoid additional power consumption caused by the unpacking calculation performed by the terminal.

Figure 5A:
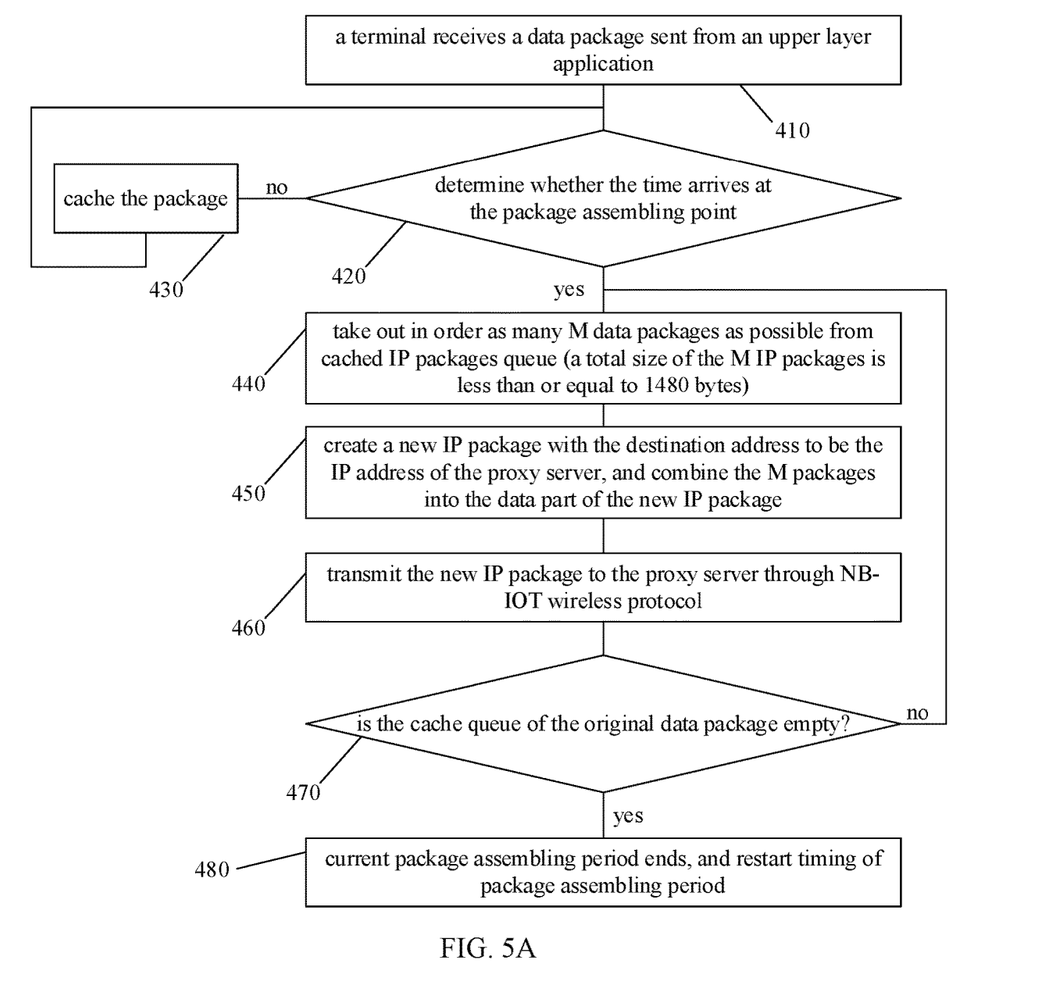
FIG. 5A is a schematic diagram of processing flow of a package assembling point period of a terminal according to an embodiment of the present disclosure.

As shown in FIG. 5A, it is a processing flow of a terminal in a package assembling point period during the data transmission process provided by the disclosure. It can be seen from the figure that the terminal after determining that the package point is reached, takes out in order as many IP data packages with a total size no more than 1480 bytes as possible from the cache queue, to perform package assembling and send them to the NB-IoT protocol stack. As shown in FIG. 5A, the process includes:

step 410: the terminal receives a data package sent by an upper layer application;

the data package is an IP package;

step 420: the terminal determines whether the time arrives at the package assembling point; step 440 is executed when it is arrived; step 430 is executed when it is not arrived;

step 430: cache the data package;

step 440: take out as many M data packages as possible from the cached data packages, and the sum of the M data packages is less than or equal to 1480 bytes;

step 450: create a new IP package with its destination IP address to the IP address of the proxy server, and splice the M packages into the data part of the newly created IP package.

step 460: send the newly created IP package to the proxy server through the NB-IoT wireless protocol stack;

step 470: it is confirmed whether the cache queue of the data package is empty; if it is empty, step 480 is executed; if it is not empty, step 440 is continued to execute;

step 480: the package assembling period is ended, and a next package assembling period is restarted.

Figure 5B:
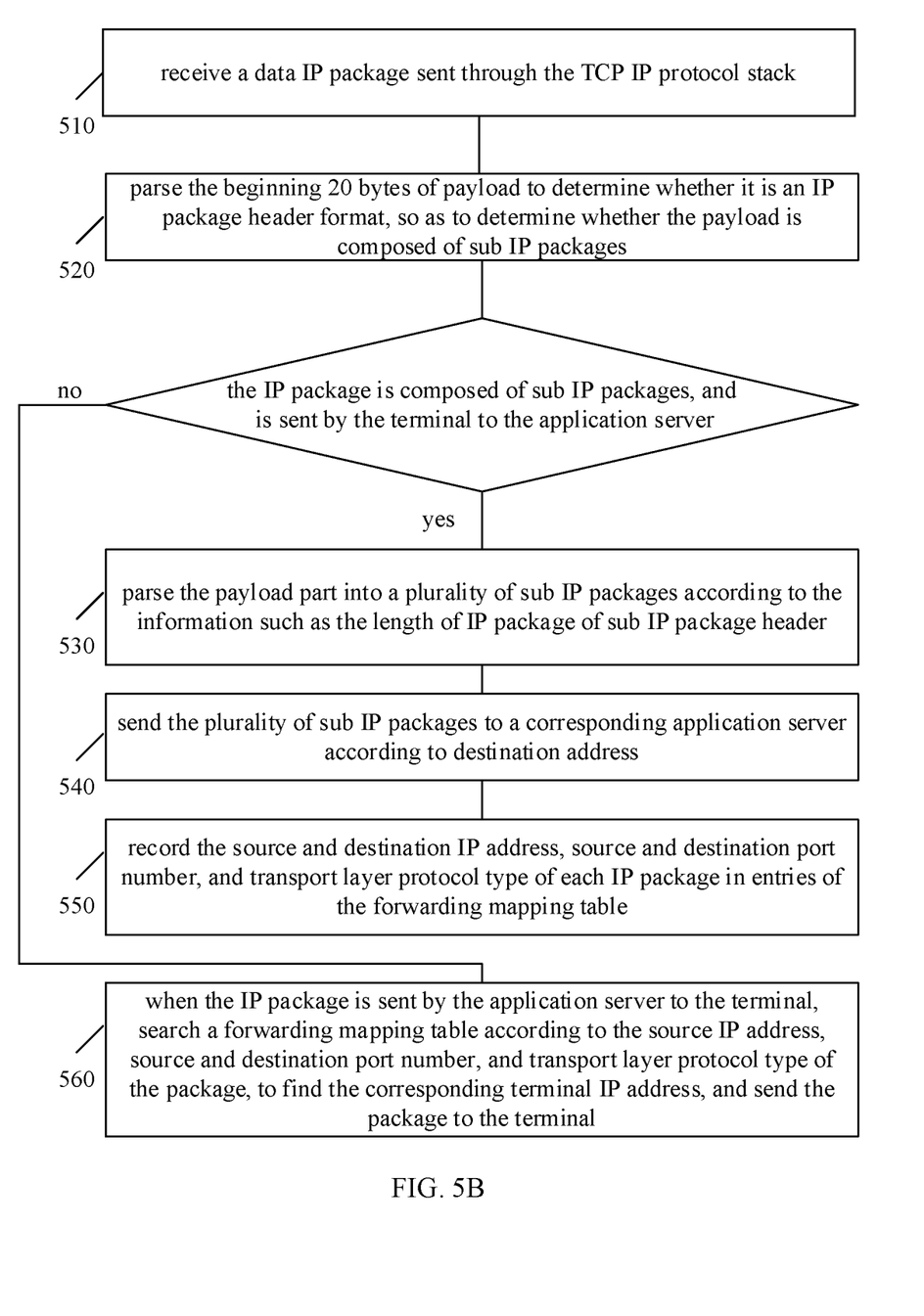
FIG. 5B is a schematic diagram of processing flow of a proxy server according to an embodiment of the present disclosure.

As shown in FIG. 5B, it is a processing flow of a proxy server provided in the present disclosure. Both the uplink package sent by the terminal to the application server and the downlink package returned by the application server to the terminal will be sent to the proxy server first, and then forwarded by the proxy server. Since the uplink data package is sent from the terminal and has undergone package assembling processing, the payload part of the uplink data package is multiple IP packages, or at least one IP package, that is, 20 bytes at the beginning of the payload part must be a data body of an IP header structure. Therefore, the proxy server can determine whether it is an uplink or a downlink data package by parsing the format of the payload of the received IP package. If the payload of the IP package is composed of sub IP packages, the payload part is parsed to generate multiple sub IP packages, that is, the original uplink IP packages, which are sent to the corresponding destination application servers, and meanwhile the source and destination IP addresses, port number, and transport layer protocol type are recorded in the mapping table. If the payload part of the IP package is not an IP package structure, it means it is an original downlink packet sent by the application server to the terminal; the proxy server directly searches the mapping table according to the source and destination IP addresses, port number, and transport layer protocol type of the package, finds the IP address of the terminal to which the server is supposed to send this IP packet, and sends the packet directly to the terminal.

As shown in FIG. 5B, it is a schematic diagram of a processing flow of a proxy server. The process includes:

step 510: the proxy server receives a data package sent through the TCP IP protocol stack;

step 520: the proxy server parses the payload data to determine whether it is an IP package header format, so as to determine whether the payload data is composed of multiple IP packages; if yes, step 530 is executed; if not, step 570 is executed;

if the payload data is composed of multiple IP packages, it means that the data is sent by the terminal to the application server, which is necessary to perform parsing operation of the IP packages; if it is not composed of multiple IP packages, it means that the data is sent by the application server to the terminal, which is not necessary to perform parsing operation of the IP packages, and can be directly forwarded to the terminal.

Step 530: the proxy server parses the payload part into multiple sub IP packages according to the information such as the length of IP package of the IP package header;

step 540: the proxy server sends each IP package to the corresponding application server;

step 550: record the source IP address, destination IP address, source port number, destination port number, and transport layer protocol type of each IP package in the entries of the forwarding mapping table;

step 560: search the corresponding destination IP address, from the forwarding mapping table according to the source IP address, source port number, destination port number, and transport layer protocol type of the IP package, and send the IP package to the terminal corresponding to the destination IP address.

In order to better understand the data transmission solution provided in the present disclosure, the following is a more typical example scenario to assist in explaining the present disclosure.

This example takes an intelligent mobile bracelet as an example to illustrate. The bracelet based on NB-IoT protocol has basic functions such as step counting, and is characterized by long use time after charging. It has typical characteristics of NB-IoT, that is, it is not sensitive to delay and sensitive to power consumption. Then present optimization solution can be used to transmit data. In this scenario, the "terminal" involved refers to the bracelet, and the "proxy server" and "application server" may be deployed on the Internet by the bracelet manufacturers. When detecting the vibration, the pedometer counts the step data and the latitude and longitude data for GPS position, which are formed to be a UDP package and sent to the proxy server, and then forwarded to the application server through the proxy server. The occurrence of vibrations is irregular. It is assumed that within a certain period of time two steps per second are taken on average, one UDP package is generated in each step, and the package assembling period of the pedometer is 5 seconds, then 10 UDP packages will be generated in each package assembling period. According to related technologies, the 10 UDP packages generated discretely will form the following 10 physical frames through the NB-IoT wireless protocol stack. The 10 physical frames contain 10 MAC frame headers, 10 RLC headers and 10 PDCP headers.

Upon adopting present solution, the amount of data in this period will be cached and then assembled at the package assembling point. After the new data package passes through the wireless protocol stack, only one physical frame is generated, including 1 MAC frame header, 1 RLC packet header and 1 PDCP packet header. If the IP package containing user data is regarded as valid data, and the three headers of the wireless protocol stack are regarded as redundant, the redundant data is reduced by 90% upon adopting present solution in this scenario. In the long-term use of the bracelet, the total amount of reduced data for transmission will be very huge, and the improvement of transmission efficiency will become more and more obvious. As the amount of data generated by the bracelet is relatively small, the unpacking burden on the proxy server side caused by the solution is completely tolerable for the server. And the delay between the package assembling points on the terminal side is completely acceptable for the bracelet in the scenario.

Based on the same or similar concepts as the above embodiments, an embodiment of the present disclosure further provides a first data transmission device, which is disposed on the terminal. The first data transmission device includes:

a cache unit, configured to cache a data IP package generated by an upper layer application before reaching a package assembling point;

an encapsulation unit, configured to encapsulate cached data IP packages as a data payload in a new IP package after reaching the package assembling point; and set the destination address in the new IP package as a proxy server address;

a sending unit, configured to send the new IP package to the proxy server.

In the embodiments of the present disclosure, the length of the new IP package is less than or equal to 1480 bytes.

In the embodiments of the present disclosure, the package assembling point is set as 0.5 to 10 seconds.

Based on the same or similar concepts as the above embodiments, an embodiment of the present disclosure further provides a terminal, herein the terminal includes any first data transmission device provided in the embodiments of the present disclosure.

Based on the same or similar concepts as the above embodiments, an embodiment of the present disclosure further provides a second data transmission device, which is disposed on the server. The second data transmission device includes:

a receiving unit, configured to receive an IP package sent by a terminal;

a parsing unit, configured to parse the received IP package, and parse a data payload of the received IP package into multiple IP packages when the data payload includes multiple IP packages;

a forwarding unit, configured to forward each parsed IP package to an application server corresponding to each IP package.

In the embodiment of the present disclosure, the second data transmission device further includes:

a mapping unit, configured to add a mapping entry to the forwarding mapping table after the forwarding unit forwards the IP package; the mapping entry includes a source IP address, a destination IP address, a source port number, a destination port number, and a transport layer protocol type.

In the embodiment of the present disclosure, the forwarding unit is further configured to, search a corresponding destination IP address according to the mapping table when data issued by the application server is received, and forward the received data to a terminal corresponding to the destination IP address.

Based on the same or similar concepts as the above embodiments, an embodiment of the present disclosure further provides a server, which includes any second data transmission device provided in the embodiments of the present disclosure.

It should be noted that the embodiments described above are only for the convenience of those skilled in the art to understand, and are not intended to limit the protection scope of the present disclosure. Without departing from the concept of the present disclosure, any obvious replacements and improvements made by those skilled in the art to the present disclosure are within the protection scope of the present disclosure.

INDUSTRIAL APPLICABILITY

The present disclosure is applicable to the field of data communication, and is used to significantly reduce the transmission of redundant data, improve the transmission efficiency, and reduce the transmission power, thereby reducing terminal power consumption. It is very suitable for an NB-IoT terminal which has demanding power consumption requirements and is not sensitive to delay.

What is claimed is:

1. A data transmission method, comprising:
caching at least one data IP package generated by an upper layer application and at least including a first destination IP address during a package assembling period;
encapsulating cached data IP packages as a data payload in a new IP package after reaching a package assembling point at an end of the package assembling period;
configuring a second destination address in the new IP package to be a proxy server address; and
sending the new IP package to a proxy server.

2. The data transmission method according to claim 1, wherein a length of the new IP package is less than or equal to 1480 bytes.

3. The data transmission method according to claim 1, wherein the package assembling period is set as 0.5 to 10 seconds.

4. A computer-readable storage medium storing computer-executable instructions that, when executed, implement the data transmission method according to claim 1.

5. A data transmission method, comprising:
receiving an IP package sent by a terminal;
parsing the received IP package; parsing a data payload of the received IP package into multiple IP packages when the data payload comprises multiple IP packages; and
forwarding each parsed IP package to an application server according to a first destination IP address in the corresponding parsed IP package.

6. The data transmission method according to claim 5, wherein the method further comprises:
adding a mapping entry into a forwarding mapping table after forwarding the IP package;
the mapping entry comprises a source IP address, the first destination IP address, a source port number, a destination port number, and a transport layer protocol type.

7. The data transmission method according to claim 6, wherein
searching a corresponding destination IP address according to the mapping table when data issued by an application server is received, and forwarding the received data to a terminal corresponding to the destination IP address.

8. A computer-readable storage medium storing computer-executable instructions that, when executed, implement the data transmission method according to claim 5.

9. A data transmission device, provided on a terminal, wherein the device comprises:
a cache unit, configured to cache at least one data IP package generated by an upper layer application and including at least one first destination IP address during a package assembling period;
an encapsulation unit, configured to encapsulate cached data IP packages as a data payload in a new IP package after reaching a package assembling point at an end of the package assembling period; configuring a second destination address in the new IP package to be a proxy server address; and
a sending unit, configured to send the new IP package to a proxy server.

10. The data transmission device according to claim 9, wherein a length of the new IP package is less than or equal to 1480 bytes.

11. The data transmission device according to claim 9, wherein the package assembling period is set as 0.5 to 10 seconds.

12. A terminal comprising the data transmission device according to claim 9.

13. A data transmission device, provided on a server, wherein the device comprises:
a receiving unit, configured to receive an IP package sent by a terminal;
a parsing unit, configured to parse the received IP package, and parse a data payload of the received IP package into multiple IP packages when the data payload comprises multiple IP packages; and
a forwarding unit, configured to forward each parsed IP package to an application server according to a first destination IP address in the corresponding to parsed IP package.

14. The data transmission device according to claim 13, wherein the device further comprises:
a mapping unit, configured to add a mapping entry into a forwarding mapping table after the forwarding unit forwards the IP package; the mapping entry comprises a source IP address, the first destination IP address, a source port number, a destination port number, and a transport layer protocol type.

15. The data transmission device according to claim 14, wherein,
the forwarding unit is further configured to, search a corresponding destination IP address according to the mapping table when data issued by an application server is received, and forward the received data to a terminal corresponding to the destination IP address.

16. A server, wherein the server comprises the data transmission device according to claim 13.

* * * * *